(12) United States Patent
Langereis

(10) Patent No.: US 9,128,114 B2
(45) Date of Patent: Sep. 8, 2015

(54) CAPACITIVE SENSOR DEVICE AND A METHOD OF SENSING ACCELERATIONS

(75) Inventor: Geert Langereis, Eindhoven (NL)

(73) Assignee: NXP, B.V., Eindhoven (NL)

( * ) Notice: Subject to any disclaimer, the term of this patent is extended or adjusted under 35 U.S.C. 154(b) by 318 days.

(21) Appl. No.: 13/119,083

(22) PCT Filed: Sep. 14, 2009

(86) PCT No.: PCT/IB2009/054002
§ 371 (c)(1),
(2), (4) Date: Mar. 15, 2011

(87) PCT Pub. No.: WO2010/029516
PCT Pub. Date: Mar. 18, 2010

(65) Prior Publication Data
US 2011/0169109 A1 Jul. 14, 2011

(30) Foreign Application Priority Data
Sep. 15, 2008 (EP) .................................. 08105349

(51) Int. Cl.
*H04R 23/00* (2006.01)
*G01P 15/125* (2006.01)
*G01P 15/08* (2006.01)

(52) U.S. Cl.
CPC ........... *G01P 15/125* (2013.01); *G01P 15/0802* (2013.01); *G01P 2015/0814* (2013.01)

(58) Field of Classification Search
CPC .............. G01P 15/0802; G01P 15/125; G01P 2015/0814; H01L 29/84
USPC .................... 257/414–420, E23.08, E21.506, 257/E21.536, E21.705, E29.324, E21.211, 257/E27.006; 73/514.32, 514.18, 514.36, 73/514.38, 514.29, 514.17, 514.23, 73/514.24; 438/48, 50, 51, 52
See application file for complete search history.

(56) References Cited

U.S. PATENT DOCUMENTS 5,025,346 A * 6/1991 Tang et al. ................. 361/283.1
5,095,762 A * 3/1992 Holm-Kennedy
et al. ........................ 73/862.041

(Continued)

FOREIGN PATENT DOCUMENTS

EP 0 877 255 A1 11/1998
EP 1 160 574 A1 12/2001

(Continued)

OTHER PUBLICATIONS

Yazdi, N., et al, "Micromachined Inertial Sensors", Procs. of the IEEE, vol. 86, No. 8, pp. 1640-1659 (Aug. 1998).

(Continued)

*Primary Examiner* — Yosef Gebreyesus

(57) ABSTRACT

The invention relates to a capacitive sensor device 100. The capacitive sensor device (100) comprises a substrate (401), a first electrode (101) coupled to the substrate (401, a second electrode (102) coupled to the substrate (401) and a movable element (103). The movable element (103) is capacitively coupled to the first electrode (101), the moveable element (103) and the first electrode (101) representing a first capacitor (104). The movable element (103) is capacitively coupled to the second electrode (102), the moveable element (103) and the second electrode (102) representing a second capacitor (105). The movable element (103) is movable between the first electrode (101) and the second electrode (102) in such a manner, that an electrical impedance between the first electrode (101) and the second electrode (102) is changeable due to a change of a position of the movable element (103). The movable element (103) is decoupled from the substrate (401), in particular to a signal line.

15 Claims, 4 Drawing Sheets

(56) References Cited

U.S. PATENT DOCUMENTS

| | | | |
|---|---|---|---|
| 5,101,669 A * | 4/1992 | Holm-Kennedy et al. | 73/862.626 |
| 5,253,526 A * | 10/1993 | Omura et al. | 73/514.16 |
| 5,345,824 A | 9/1994 | Sherman et al. | |
| 5,417,312 A * | 5/1995 | Tsuchitani et al. | 188/181 A |
| 5,511,420 A * | 4/1996 | Zhao et al. | 73/514.18 |
| 5,610,335 A * | 3/1997 | Shaw et al. | 73/514.36 |
| 5,628,100 A * | 5/1997 | Johnson et al. | 29/25.41 |
| 6,149,190 A | 11/2000 | Galvin et al. | |
| 6,170,332 B1 | 1/2001 | MacDonald et al. | |
| 6,199,874 B1 | 3/2001 | Galvin et al. | |
| 6,230,567 B1 * | 5/2001 | Greiff | 73/514.37 |
| 7,566,994 B2 * | 7/2009 | Medi et al. | 307/109 |
| 8,194,386 B2 * | 6/2012 | Steeneken et al. | 361/277 |
| 2001/0048139 A1 * | 12/2001 | Aigner et al. | 257/415 |
| 2003/0140699 A1 * | 7/2003 | Pike et al. | 73/514.32 |
| 2005/0132805 A1 * | 6/2005 | Park et al. | 73/514.32 |
| 2005/0252293 A1 | 11/2005 | Won et al. | |
| 2006/0272414 A1 | 12/2006 | Ayazi et al. | |
| 2007/0027627 A1 * | 2/2007 | Lawrence et al. | 701/213 |
| 2007/0029629 A1 * | 2/2007 | Yazdi | 257/414 |
| 2007/0032749 A1 * | 2/2007 | Overall et al. | 600/595 |
| 2007/0119252 A1 * | 5/2007 | Adams et al. | 73/510 |
| 2007/0220975 A1 * | 9/2007 | Suzuki | 73/514.32 |
| 2009/0080207 A1 * | 3/2009 | Hurwitz | 362/464 |
| 2009/0140443 A1 * | 6/2009 | Hohlfeld et al. | 257/786 |
| 2009/0320557 A1 * | 12/2009 | Sammoura et al. | 73/9 |
| 2010/0231237 A1 * | 9/2010 | Deschildre et al. | 324/661 |
| 2010/0257933 A1 * | 10/2010 | Verjus et al. | 73/504.04 |
| 2012/0062244 A1 * | 3/2012 | Santana et al. | 324/658 |

FOREIGN PATENT DOCUMENTS

| | | |
|---|---|---|
| EP | 1 624 284 A1 | 2/2006 |
| WO | 2007/096873 A2 | 8/2007 |

OTHER PUBLICATIONS

Gindila, M., et al. "Electronic Interface Design for an Electrically Floating Micro-Disc", J. of Micromechanics & Microengineering, vol. 13, No. 4, pp. S11-S16 (Jul. 2003).

Van Heeren, Henne, et al, "Rewards and Risks of Moving into New Applications: Case Study Accelerometers"; MST News 1, pp. 35-39 (2007).

International Search Report and Written Opinion for Int'l. Patent Application No. PCT/IB2009/054002 (Jan. 4, 2010).

\* cited by examiner

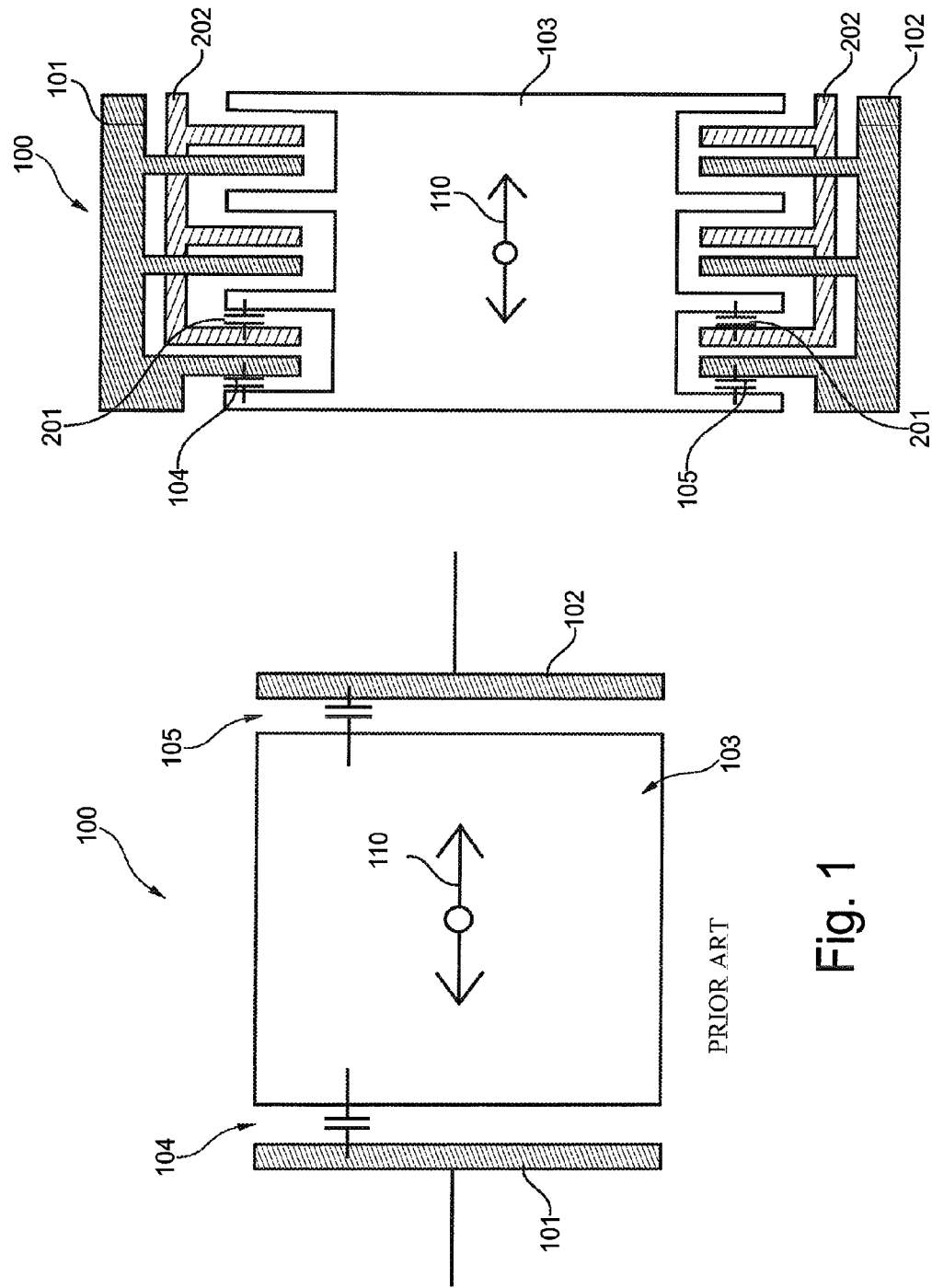

CAPACITIVE SENSOR DEVICE AND A METHOD OF SENSING ACCELERATIONS

FIELD OF THE INVENTION

The invention relates to a capacitive sensor device, in particular a MEMS accelerometer.

Moreover, the invention relates to a method of sensing accelerations.

BACKGROUND OF THE INVENTION

Accelerometers have become multi-market devices due to cost-down using MEMS technology. MEMS accelerometers may be found in mobile phones, cars and game-controls. All commercial accelerometers are based on a tiny mass-spring system of which the displacement of the mass is proportional to the acceleration. To detect the displacement electronically, a capacitive read-out is the most common. Preferably, accelerometers are implemented as Micro-Electro-Mechanical Systems, also known as (MEMS) systems. Micro-Electro-Mechanical Systems may be denoted as the technology of the very small members, and merges at the nano-scale into nano-electromechanical systems (NEMS) and nanotechnology. MEMS may be made up of components between 1 μm (micrometer) to 100 μm (micrometer) in size and MEMS devices may generally range in size from 20 μm (micrometer) to 1 mm (millimeter).

Several operational areas are found. For measuring small accelerations in car stability programs and precise controllers in gaming applications, a highly linear response in the range from 0 to 2 g is needed.

In the following, the basic accelerator technology is explained. Consider a mass M on a spring with spring constant k. The force F on the mass due to an acceleration a is given by $$F = M \cdot a.$$

On the other hand, the force to exert the spring by a distance dx is given by the relation $$F = k \cdot dx$$

with k the spring constant. These two forces are in balance in (quasi) static situations because the mechanical inertia of the mass puts a force on the spring resulting in $$dx = \frac{M}{k} \cdot a.$$

So, the excursion dx of the mass is linearly dependent on the applied acceleration a. The relation is determined by the ratio M/k. The displacement of a mass may be measured capacitively by placing two capacitor plates on the two sides of the mass.

As shown in FIG. 1, between a first electrode 101 and a movable element 103 a first capacitor 104 may be represented and between a second electrode 102 and the movable element 103 a second capacitor 105 may be represented. As shown in FIG. 1, due to a movement of the movable element 103 along the main moving direction 110, the distance between the second electrode 102 and the movable element 103 may increase and the distance between the a second electrode 102 and the movable element 103 may decrease when the movable element 103 moves to the left, for instance.

To understand the relation of mechanical motion to a change in capacitance, the approximation for a parallel plate capacitor without fringing effects is sufficient:

$$C = \frac{\varepsilon A}{d}$$

with C the capacitance, A the surface e.g. of the capacitor plates or capacitor electrodes, d the gap thickness and ε the permittivity of the material in the gap. By example of parameter change, an increase in the gap thickness may give a decrease in the electrical capacitance.

U.S. Pat. No. 5,345,824 describes an accelerometer comprising a micro fabricated acceleration sensor and monolithically fabricated signal conditioning circuitry. The sensor comprises a differential capacitor arrangement formed by a pair of capacitors. Each capacitor comprises two electrodes, one of which it shares electrically in common with the other capacitor. One of the electrodes (e.g., the common electrode) is movable and one of the electrodes is stationary in response to applied acceleration. The electrodes are all formed of polysilicon members suspended above a silicon substrate. Each of the capacitors is formed of a plurality of pairs of electrode segments electrically connected in parallel and, in the case of the movable electrodes, mechanically connected to move in unison. When the substrate is accelerated, the movable electrodes move such that the capacitance of one of the capacitors increases, while that of the other capacitor decreases. The two capacitors are connected to signal conditioning circuitry, which converts this differential capacitance into a corresponding voltage.

U.S. Pat. No. 6,199,874 describes a micromechanical capacitive accelerometer from a single silicon wafer. The accelerometer may comprise a signal-conditioned accelerometer wherein signal-conditioning circuitry is provided on the same wafer from which the accelerometer is formed, and VLSI electronics may be integrated on the same wafer from which the accelerometer is formed. The micromechanical capacitive accelerometer can be used for airbag deployment, active suspension control, active steering control, anti-lock braking, and other control systems requiring accelerometers having high sensitivity, accuracy and resistance to out of plane forces.

US 2005/0132805 A1 describes an accelerometer capable of compensating initial capacitance. In the accelerometer, support beams are extended from a beam-fixing section to elastically support both ends of a horizontally movable floating mass. Movable electrodes are extended outward from both sides of the mass to a predetermined length. Fixed electrodes are extended from electrode-fixing sections to a predetermined length, and alternate with the movable electrodes with a predetermined gap. Compensation electrode sections displace the mass in a moving direction of the mass to equalize an initial capacitance between the movable and fixed electrodes at one side with that between the movable and fixed electrodes at the other side. The invention can simply displace the mass compensation electrodes to equalize initial capacitances at the both ends.

US 2006/272414 A1 discloses moveable microstructures comprising in-plane capacitive micro-accelerometers, with sub-micro-gravity resolution and high sensitivity. The microstructures are fabricated in thick silicon-on-insulator (SOI) substrates or silicon substrates using a two-mask fully-dry release process that provides large seismic mass, reduced capacitive gaps, and reduced in-plane stiffness. An AC signal is injected onto the proof mass or substrate.

OBJECT AND SUMMARY OF THE INVENTION

It is an object of the invention to provide a proper accelerometer.

In order to achieve the object defined above, a capacitive sensor device and a method of sensing accelerations according to the independent claims are provided.

According to a first exemplary embodiment of the present invention, a capacitive sensor device (for instance configured as a MEMS device) is provided comprising a substrate, a first electrode coupled to the substrate, a second electrode coupled to the substrate and a movable element. The movable element is capacitively coupled to the first electrode, the moveable element and the first electrode representing a first capacitor. The movable element is capacitively coupled to the second electrode, the moveable element and the second electrode representing a second capacitor. The movable element is movable between the first electrode and the second electrode in such a manner that an electrical impedance between the first electrode and the second electrode is changeable due to a change of a position of the movable element. The movable element is decoupled from the substrate.

According to a further exemplary embodiment of the present invention, a method of sensing accelerations is provided. A movable element is capacitively coupled to a first electrode, the moveable element and the first electrode representing a first capacitor. The movable element is capacitively coupled to a second electrode, the moveable element and the second electrode representing a second capacitor. The movable element moves between the first electrode and the second electrode in such a manner that electrical impedance between the first electrode and the second electrode is changeable due to the position of the movable element. The movable element is decoupled from a substrate of the sensor device.

The "movable element" may particularly be configured as a physical structure of the field of microelectromechanical systems (MEMS). MEMS movable elements may be fabricated for instance from mono- or poly-crystalline silicon. Furthermore, the movable element may be adapted for conducting a current from a first electrode to a second electrode. Due to the change of a position of the movable element, the impedance between the first electrode, the movable element and the second electrode may be changed. The movable element may therefore also be denoted as a proof-mass. Connecting the movable element with the first electrode or the second electrode by capacitively coupling may provide this so that the movable element represents a first capacitor with the first electrode and a second capacitor with the second electrode. Thus, when the movable element moves, gaps between the movable element, the first electrode and the second electrode may change and thus the capacity and the impedance of circuit. Hence, a position of the movable element itself may be measured due to the change of impedance. The movable element may consist of an electrically conducting material or may comprise a conductor that conducts the current from the first electrode to the second electrode.

The term "substrate" may denote a base area of a MEMS structure and may furthermore denote a ground area comprising a signal line that is adapted for providing signals electrically, capacitively, inductively or galvanically to reception elements or from emitting elements. Thus, the term "substrate" may denote a grounded substrate, a signal line and/or any other wires that are connected to a signal generator.

According to the present invention, the movable element may not be connected or coupled galvanically to the substrate, i.e. the movable element is thus decoupled. In other words, a coupling of the movable element with the substrate may be omitted so that also a mass contact with the substrate may be omitted. In addition, there is no electrical contact between the movable element and the substrate or any other signal line, so that the electrical or galvanical contact between the proof-mass (moveable element) and any signal line or substrate may be omitted.

In conventional accelerometer systems the movable element comprises a contact, in particular an electrical contact, from the proof mass, to the bulk material, respectively the substrate. Thus, in conventional systems by coupling the movable element to the substrate for providing a bulk contact, or to a carrier signal by means of an ohmic contact, it may be for instance the object to measure a mismatch, in particular a fabrication mismatch, of the accelerometers. In conventional systems, some of the proof masses or movable elements are connected to the (grounded) substrate and/or to an injected signal line. Furthermore, in conventional systems, a contact between the movable element respectively the proof mass and a plurality of different electrodes may be provided for measuring the direction of the acceleration. Hence, when providing a proof-mass or a coupling of the movable element to the substrate, and when using a plurality of electrodes, further interconnected layers, in particular further conducting layers, have to be generated in the fabrication process of the MEMS accelerometer.

According to the described invention the capacitive sensor device provides the movable element (proof mass element) that is decoupled from the substrate, i.e. no bulk contact or an ohmic contact to a signal line or to the substrate is provided to the movable element. In particular, there is no galvanic coupling from the movable element (the proof mass) to any substrate, in particular to a signal line or a ground plane, which means there may be no DC-path. No further conducting layers or interconnection layers may therefore be needed so that the capacitive sensor device may be fabricated in a few fabrication process steps. The movable element may thus be located in the same plane as the first electrode and the second electrode, because no further conducting layers may be needed. In other words, only one layer may be produced, e.g. by etching, in the substrate for both, the movable element and the first electrode and the second electrode. Although the movable element may be decoupled from the substrate, acceleration, in particular for high-G accelerations may be measured. High-G accelerations may be for instance in the range of 2 g to 10 g (g=[9.81 m/s$^2$]).

Thus, a capacitive sensor device is provided without needing complex fabrication methods for fabricating further additional conducting layers that would lead to additional processing steps and the need of processing masks for instance. Without the need of further conducting layers over further interconnection layers, further processing steps may be needless and hence planarization problems and fabrication costs may be reduced.

According to a further exemplary embodiment, the movable element is galvanically decoupled from the substrate. According to the exemplary embodiment it may be concretize that there is no galvanical connection between the movable element and the substrate. In other words the movable element is electrically floating which may denote that there is no galvanic contact from the movable element (proof mass) to the substrate, in particular to the signal line. Any contact to the substrate (bulk material) or a signal generator may thus be avoided. This underlines that for producing or fabricating the capacitive sensor device less fabrication steps may be needed because no further conducting layers are needed, for instance for providing further conducting layer for an electrical connection between the movable element and the substrate.

According to a further exemplary embodiment of the present invention, a first distance between the first electrode and the movable element corresponds to the position of the movable element. Furthermore, according to a further exemplary embodiment, a second distance between the second electrode and the movable element corresponds to the position of the movable element. Between the movable element and the first electrode and/or between the movable element and the second electrode an air gap d may be provided. The size d of the air gap is based on the change dx of the position of the movable element respectively the direction of acceleration of the movable element along the main moving direction. A capacitive readout method may thus be provided, wherein the sizes of the movable element, the first electrode and the second electrode may comprise 100 µm×100 µm (micrometers) up to 700 µm×700 µm (micrometers). Thus, the represented first capacitors and second capacitors and particularly the capacitance along the edges may comprise a surface of 100 µm to 700 µm (micrometers) and provides a thickness of 1 µm to 20 µm (micrometers), for instance. When the gap between the movable element and the first or second capacitor is small, a lower impedance Z may be measured and if the gap between the movable element and the first or second electrodes increases, also the impedance Z will increase.

According to a further exemplary embodiment, the represented first capacitor and the represented second capacitor are connected in series. I.e. by connecting the first capacitor C1 and the second capacitor C2 device in series, the impedance Z is:

$$Z = \frac{1}{j\omega C_1} + \frac{1}{j\omega C_2}$$

The impedance is $Z=1/j\omega C1++1/j\omega C2$ with j the imaginary number and ω the frequency $\omega=2*\pi f$. Z is an imaginary number and frequency dependent. The impedance may be plotted in a parabola graph and is actually the modulus of the impedance. I.e. an equivalent capacitance of the series circuit of the first capacitor and the second capacitor is equal to $1/Ceq=1/C1+1/C2$. Thus, by connecting the first capacitor and the second capacitor in series, a capacitive readout circuitry may be provided, wherein capacitive readout circuitry results into a non-linear response. I.e., when in a diagram the axis of abscissas describes the displacement of the movable element and the impedance Z may be expressed in the axis of ordinates, a parabolic measurement curve may be measured. I.e., that for small movements of the movable element, the impedance Z is only changed little around the vertex of the curve, wherein for large movements of the movable element large changes in the impedance Z may be measured. Thus, in particular for high-g acceleration, a good measuring result may be achieved. On the other side, small acceleration that generates only a small movement of the movable element causes a small change in the impedance Z, so that the capacitive sensor of the present exemplary embodiment may filter small accelerations without further devices. Thus, without any additional filtering methods, small accelerations may be damped or filtered out. Furthermore, mismeasurements due to e.g. fabrication mismatches may be filtered out automatically because most of the fabrication mismatches would lead to a small movement of the movable element, so that this small movement of the movable element only leads to a small change in the measured impedance Z, so that no further measures have to be provided to correct the measuring. Hence, an incomplex sensor device may be provided.

According to a further exemplary embodiment at least one of the first capacitor and the second capacitor comprises a first partial capacitor and a second partial capacitor. The first partial capacitor and the second partial capacitor are connected parallel. Under the term "partial capacitor" it may denoted, that a capacitor is divided into several sub or partial capacitor, wherein the sum of all capacities of the partial capacitor form the capacitor. A partial capacitor may be comprise corresponding capacitor plates or corresponding capacitor electrodes, one capacitor plate e.g. located on the surface of the moveable element and one opposing capacitor plate located on the surface of the first electrode or second electrode. The capacitor plates or capacitor electrodes of the first partial capacitor are physically dislocated to other second partial capacitor electrodes or plates. When connecting the first partial capacitor and the second partial capacitor in parallel, the measurement signal may be improved. I.e. the measured impedance Z may be measured by the capacitance of the first partial capacitor and the second partial capacitor. Furthermore, it may be possible that the first distance or the second distance respectively the size of the gap of the first partial capacitor will be increased while the gap of the second partial capacitor may decrease due to the change of the position of the movable element, or vice versa. The reciprocal values of the capacities of the first partial capacitor and the second partial capacitor may be added and form the total impedances Z. Thus, an improved measurement signal for the total impedance Z may be achieved.

According to a further exemplary embodiment, the moveable element and at least one of the first electrode and the second electrode interdigitates with each other. According to a further exemplary embodiment, at least one of the first electrode and the second electrode comprise at least one electrode finger protruding in the direction to the movable element. The movable element comprises at least one movable finger protruding at least in the direction to the at least one of the first electrode and the second electrode. The electrode finger and the movable finger are adapted for interdigitating with each other. In other words, the movable element and the first electrode or second electrode engaging comb-shaped with the movable fingers and the electrode fingers. The capacitive sensor device, in particular the movable element and/or the represented first capacitor and/or the represented second capacitor, may comprise interdigitated finger electrodes which may be physically located at the electrode finger and/or the movable finger. The capacitively coupling may be provided between the electrode finger and the movable finger. Thus, when providing interdigitating electrode fingers and movable fingers, the surface between the movable element and the first electrode or the second electrode may be increased, so that for instance larger capacitor electrodes and larger surfaces of the capacitor electrodes or capacitor plates may be provided for the capacitively coupling. Thus, better measurement results may be achieved.

According to a further exemplary embodiment a method of producing a capacitive sensor device as denoted above is provided. According to the method, a substrate is provided. A buried oxide layer is formed on the substrate and a top silicon layer is formed on the buried oxide layer. In the top silicon layer etching holes and trenches are etched, wherein a pattern of the holes and trenches are defined by a mask. The buried oxide layer located below the top silicon layer is removed according to the pattern. For crash and fall-detection sensors, a sensor is needed up to at least 10 g while linearity is less an issue. The invention may provide a capacitive MEMS accelerometer, which may be optimised for high-g applications. A system layout is proposed in which the number of processing or fabricating steps of the device may be reduced and therefore the fabricating costs may decrease significantly.

Furthermore, the capacitive sensor device comprises a simple planar accelerometer layout wherein only a few layers, in particular one, for both, the movable element and the first electrode and second electrode, may be needed. This may reduce the number of masks for the fabrication process of the device, e.g. to two masks, while in conventional devices five and more masks for the additional layers are needed.

Embodiments of the invention are not bound to specific materials, so that many different materials may be used. For conductive structures, it may be possible to use metallization structures, silicide structures or polysilicon structures. For semiconductor regions or components crystalline silicon or polysilicon may be used. For insulating portions, silicon oxide or silicon nitride may be used.

In an embodiment, the capacitive sensor device may be monolithically integrated, for instance in semiconductor technology, more particularly in silicon technology.

The aspects defined above and further aspects of the invention are apparent from the examples of embodiment to be described hereinafter and are explained with reference to these examples of embodiment. The exemplary embodiments described for the capacitive sensor device may also be applied to exemplary embodiments of the method of sensing accelerations and vice versa.

BRIEF DESCRIPTION OF THE DRAWINGS

In the following, exemplary embodiments of the present invention will be specified for further explanation and for a better understanding with reference to the attached drawings:

FIG. 1 illustrates a schematical view of an accelerometer;

FIG. 2 illustrates an accelerometer including further electrodes according to a conventional embodiment;

DESCRIPTION OF EMBODIMENTS

Figure 3:
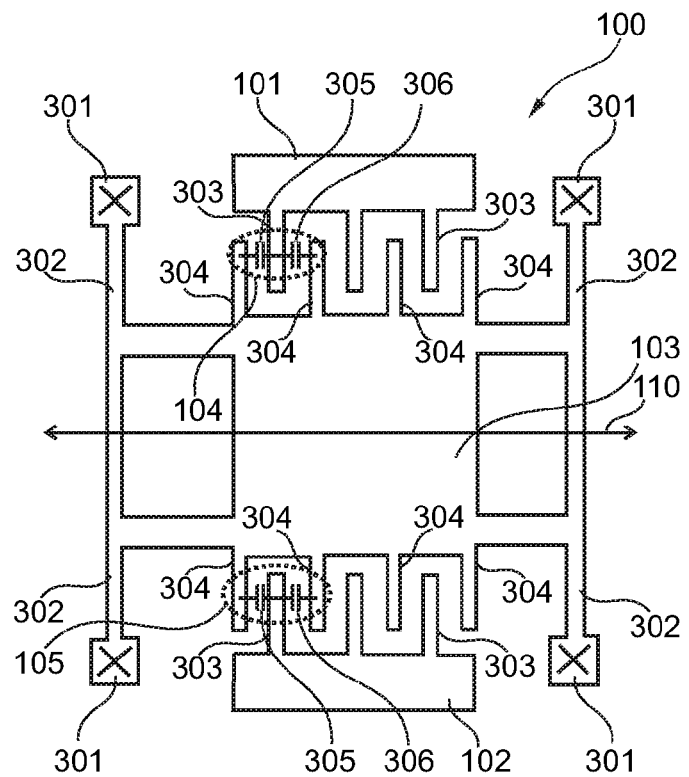
FIG. 3 illustrates a capacitive sensor device according to an exemplary embodiment of the present invention.

The illustrations in the drawings are schematical. In different drawings, similar or identical elements are provided with the same reference signs. The view in the figures is schematical and not fully scaled.

FIG. 3 illustrates an exemplary embodiment of the capacitive sensor device 100, comprising a substrate 401 (illustrated in FIG. 4 below), a first electrode 101 coupled to the substrate 401, a second electrode 102 coupled to the substrate 401 and a movable element 103. The movable element 103 is adapted to be electrically coupled to the first electrode 101 and to the second electrode 102. The movable element 103 is capacitively coupled to the first electrode 101, the moveable element 103 and the first electrode 101 representing a first capacitor 104. The movable element 103 is capacitively coupled to the second electrode 102, the moveable element 103 and the second electrode 102 representing a second capacitor 105. The movable element 103 is movable between the first electrode 101 and the second electrode 102 in such a manner, that an electrical impedance between the first electrode 101 and the second electrode 102 is changeable due to change of a position of the movable element 103. The movable element 103 is decoupled from the substrate 401.

In FIG. 1 an accelerometer comprising a first electrode 101, a second electrode 102 and a movable element 103 is shown. Furthermore, the first electrode 101 is coupled to the movable element 103 capacitively by representing a first capacitor 104 and the second electrode 102 is coupled to the movable element 103 capacitively by representing a second capacitor 105. Furthermore, the movable element 103 is adapted for being movable in a main moving direction 110. When moving the movable element 103, a gap d between the represented capacitor electrodes respectively of the represented first capacitor 104 and the represented second capacitor 105 is changed so that also an impedance Z of the represented capacitors 104, 105 may be changed. Thus, the change of the position of the movable element 103 may be measurable due to the change in impedance Z of the represented first capacitor 104 and the represented second capacitor 105. In conventional systems, the movable element is connected or coupled, in particular electrically, to a substrate 401, a bulk material or an additional electrical signal for detection purposes. By doing this, conventional systems may measure capacitances C1 and C2 individually. According to an exemplary embodiment the movable element 103 is electrically floating for measuring a reciprocal sum Ceq of C1 and C2 of the series of the first capacitor 104 and the second capacitor 105. However, this makes the hardware much simpler. Conventional systems may use a proof-mass contact from the movable element 103 to the substrate 401 and at least two contacts to the read-out plates, namely the first electrode 101 and the second electrode 102.

FIG. 2 illustrates an accelerometer according to a conventional embodiment including a first electrode 101, a second electrode 102 and a movable element 103. The movable element 103 is connected to a substrate 401 (illustrated in FIG. 4 below) or to a bulk material. Furthermore, the movable element 103 is movable in the main moving direction 110. Furthermore, the embodiment in FIG. 2 comprises a further electrode 202. The first capacitor 104 is adapted for coupling the first electrode 101 to the movable element 103 and the second capacitor 105 is adapted for coupling the second electrode 102 to the movable element 103. A capacitor of the further electrode 201 is adapted for coupling the movable element 103 with the further electrode 202. Thus, a plurality of further conducting layers in the fabrication process may be required in order to connect in particular the further electrode 202. This may lead to increased fabrication costs. The consequence of this method is that the signal lines for connecting the electrode fingers, in particular for the further electrode 202, have to cross each other which result in extra processing steps to create and extra interconnect layer as shown in FIG. 2.

FIG. 3 comprises furthermore anchor points 301 for holding the movable element 103. The movable element 103 is connected to the anchor points 301 by spring elements 302, so that the movable element 103 may be flexibly fixed and a movement along the main movement direction 110 may still be possible.

Furthermore, the represented first capacitor 104 and the represented second capacitor 105 comprise the first partial capacitor 305 and the second partial capacitor 306. The first partial capacitor 305 and the second partial capacitor 306 may connected in parallel because the comb structures, namely the comb structured first electrode 101 and the comb structured second electrode 102, and the comb structured movable element 103 may be electrically conductive. When the first partial capacitor 305 and the second partial capacitor 306 is connected in parallel, the measurement result may be improved because a parabolic measurement curve may be provided, as described in more detail below. A partial capacitor 305, 306 may represent a conductive layer onto the movable element 103 and a respective conductive layer onto the first electrode 101 or the second electrode 102, so that a capacitive coupling may be provided.

FIG. 3 further illustrates interdigitating fingers 303, 304 comprising electrode fingers 303 that produce in the direction to the movable element 103 and movable fingers 304 protruding from the movable element 103 in the direction to the first electrode 101 or the second electrode 102. By providing the interdigitating electrode fingers 303 and movable fingers 304, the surface where the electrical or capacitive coupling is provided may be increased. Furthermore, the surface between the movable element 103 and the first electrode 101 and/or the second electrode 102 may be increased, so that the surface where a capacitively coupling is provided may be increased and an improved measurement result may be achieved.

The first partial capacitor 305 may be formed on a lateral surface of the moveable finger 304 and a respective opposite lateral surface of the electrode finger 303. The second partial capacitor 306 may be formed on an opposite lateral surface of the moveable finger 304 with respect to the first partial capacitor 305 and may be formed on a respective opposite lateral surface of another electrode finger 303. The lateral surfaces of the electrode finger 303 and moveable finger 304 may comprise a surface normal that extends parallel to the direction of the main moving direction 110 of the movable element 103.

If the movable element 103 moves for instance to the right along the main moving direction 110, then the gaps d or the first distance of the first partial capacitor 305 increase while the gaps d or the second distance of the second partial capacitor 306 decrease, or vice versa. E.g. the capacity of the first partial capacitor 305 is connected in parallel to the capacity of the second partial capacitor 306, wherein the reciprocal values of the first partial capacitors 305 and the capacity of the second partial capacitors 306 form the total capacity C1. The total capacity C2 of the second capacitor 105 may be connected in parallel to the total capacity C1 of the first capacitor 104. In that case, the measurement result of the total capacitance Ceq due to an acceleration and movement of the movable element 103 provides a parabolic shape if expressed by the impedance Z=1/jωCeq=1/jωC1+1/jωC2. This may make it easy to detect high accelerations while small movements of the movable element 103 are suppressed. Thus, the parabolic read out curve may be provided due to making the circuit insensitive to accelerations when placed e.g. in a bridge circuit. The parabolic read out curve of the measurement results may be calculated e.g. from the equation below. When the impedance Z is sensed between the first electrode 101 and the second electrode 102, the total impedance becomes:

$$Z = \frac{1}{j\omega C_{1a}} // \frac{1}{j\omega C_{1b}} + \frac{1}{j\omega C_{2a}} // \frac{1}{j\omega C_{2a}}$$

$$= 2\frac{1}{j\omega \varepsilon A}\left(\frac{1}{d+dx} + \frac{1}{d-dx}\right)^{-1}$$

The term "x//y" denotes that "x is connected in parallel to y". The terms "$C_{1a}$" and "$C_{2a}$" denote the capacitance of the respective first partial capacitor 305 and the terms "$C_{1b}$" and "$C_{2b}$" denote the capacitance of the respective second partial capacitor 306.

Figure 4:
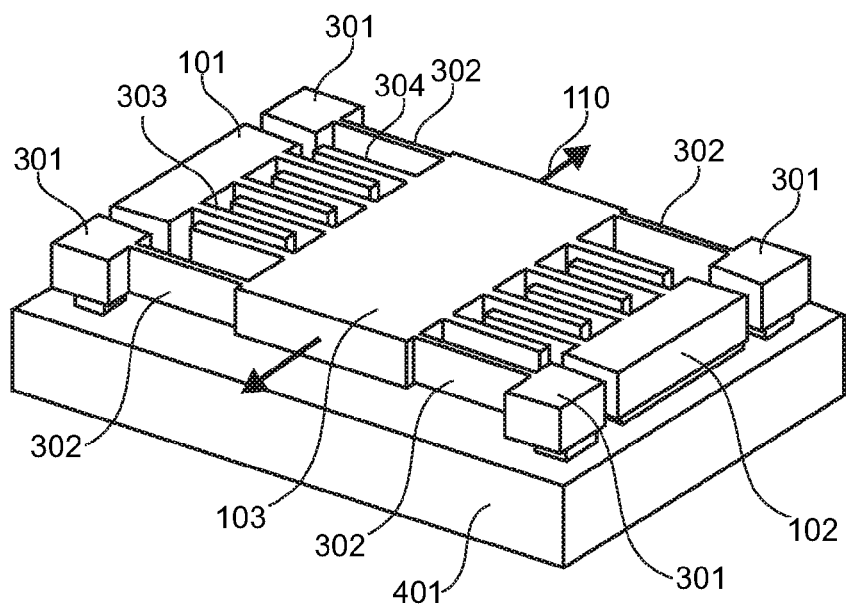
FIG. 4 illustrates a schematical view of an exemplary embodiment of the capacitive sensor device according to an exemplary embodiment.
Figure 5A:
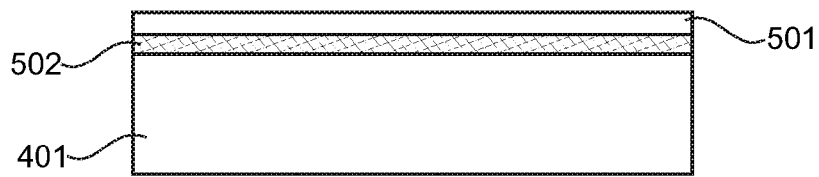
FIGS. 5a to 5e illustrates several fabrication steps for producing a capacitive sensor device according to an exemplary embodiment of the invention.
Figure 5B:
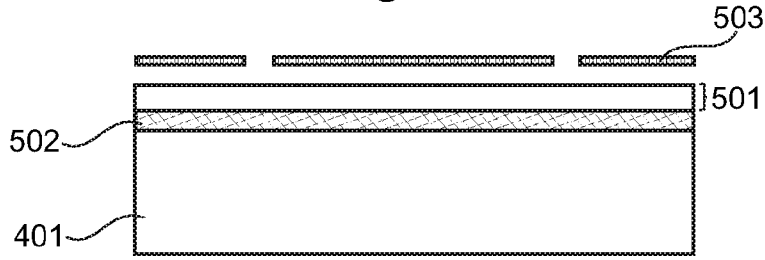
Figure 5C:
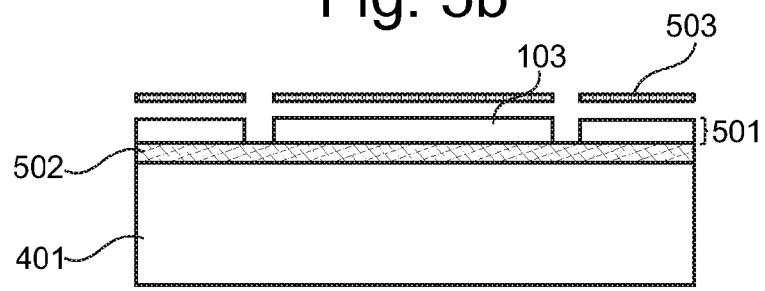
Figure 5D:
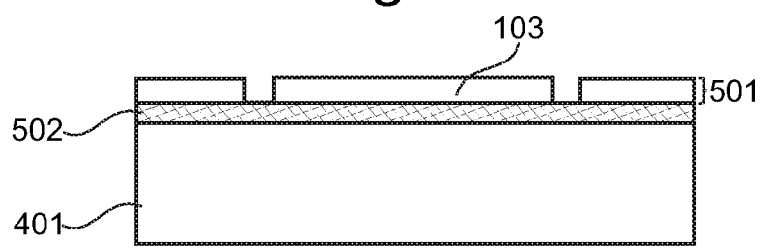
Figure 5E:
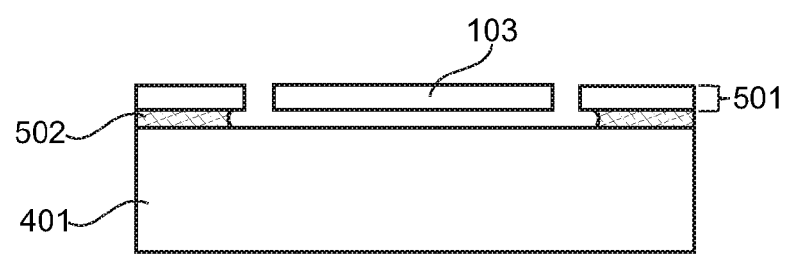

FIG. 4 illustrates a perspective view of an exemplary embodiment of the capacitive sensor device 100 that is mounted to the substrate 401. The movable element 103 is movable in the main moving direction 110 and is fixed by the spring elements 302 to the anchor points 301. Furthermore, the electrode fingers 303 and the movable fingers 304 are shown which interdigitating with each other. The electrode fingers 303 and the movable fingers 304 may be equally spaced and may comprise symmetric gaps between each other.

FIG. 5 illustrates a method of producing a capacitive sensor device, in particular silicon on isolator (SOI) based accelerometer device. A way to create a planar mass on a spring, e.g. a movable element 103, in silicon is by using Silicon on Insulator (SOI) substrate. The SOI-MEMS process is represented in FIG. 5a to FIG. 5e. As shown in FIG. 5a, an SOI wafer may consist of a silicon substrate 401, a buried oxide layer 502 and on top a silicon layer 501. This silicon layer 501 can be in the range of 1 μm to 20 μm (micrometer) and is commonly patterned using for instance the Bosch Deep Reactive Ion Etching (DRIE) process. This is schematically represented in FIGS. 5b to 5e. After holes and trenches are etched in the top silicon, the buried oxide layer 502 can be removed locally through the holes and trenched by a wet etch. After drying, free hanging structures, such as the movable element 103, as shown in FIG. 5e may be created. This free hanging element may be the mass, in particular the movable element 103, of the accelerometer or capacitive sensor device 100. So, in principle, the SOI MEMS process shown in FIG. 5a to FIG. 5e may only need a single mask 503. However, the same mask 503 may define the first electrode 101 and the second electrode 102.

The capacitive sensor device 100 may comprise a planar accelerometer, which may easily be etched out of a Silicon on Insulator (SOI) wafer. By the term "planar" it may be denoted a capacitive sensor device wherein all functional elements, such as the first electrode 101, the second electrode 102 and the movable element 103 are located in on common plane. The advantage of a simple planar accelerometer layout is that only one layer may be needed, which reduces the number of masks to two, while conventional devices may need five or even more.

Figure 6:
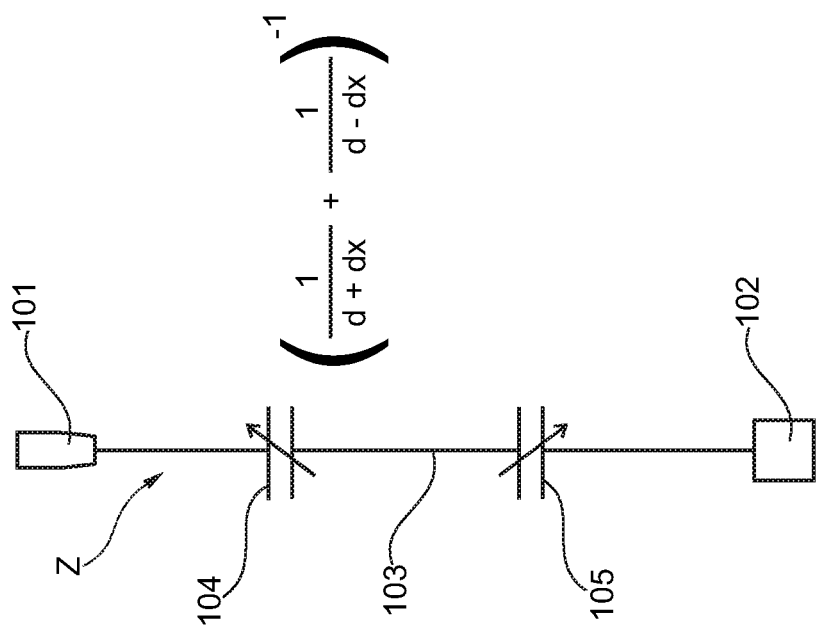
FIG. 6 illustrates a schematical view of first and second capacitors connected in series according to an exemplary embodiment of the present invention.

FIG. 6 illustrates a schematical view of an electrical circuit wherein the first capacitor 104 and the second capacitor 105 are connected in series. The impedance may be measured between the first electrode 101 and the second electrode 102 wherein the electrical current, in particular AC-current, flows from the first electrode 101 over the movable element 103 to the second electrode 102. When connecting the first capacitor 104 and the second capacitor 105 in series, a non-linear measurement result may be provided. The circuit shows that there is no galvanic connection between the movable element 103 (the proof mass) and another substrate 401, in particular the substrate itself or a signal line.

Figure 7:
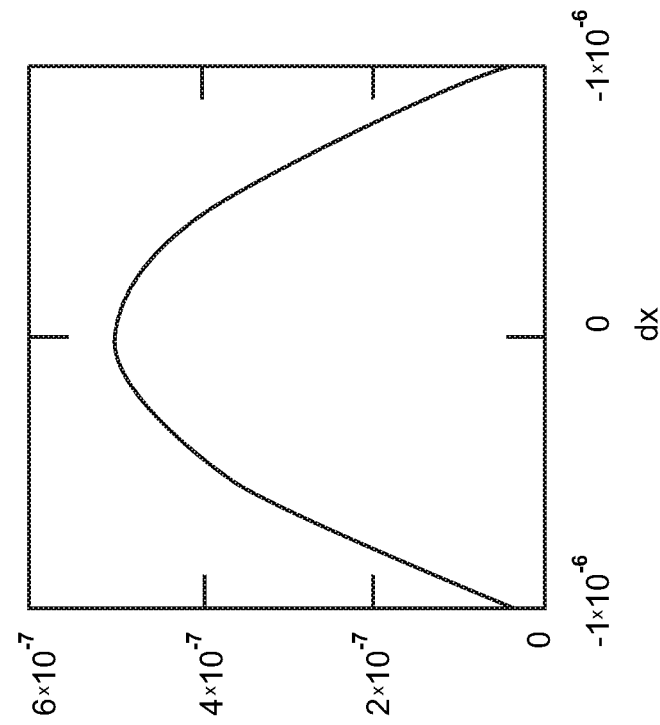
FIG. 7 illustrates a diagram of a measurement curve of a sensor device according to the exemplary embodiment shown in FIG. 6.

FIG. 7 shows a read-out curve/response that may measure the electrical impedance between first electrode 101 and the second electrode 102, wherein the represented first capacitor 104 and the represented second capacitor 105 are connected in series, as shown schematically in FIG. 6. On the x-axis, the movement of the movable element 101 along the main moving direction 110 is described. At the y-axis, the change in impedance is described. If the movable element 103 is not moved, the vertex of the parabolic curve is placed. Due to a movement of the movable element 103 along the main moving direction 110, the impedance Z along the y-axis is changed. In the vicinity of the vertex of the measurement curve the change in impedance Z is only little. When the movement of the movable element 103 increase due to high accelerations, such as evaluations more than 2 g, the change in impedance Z increases dramatically. I.e., for little accelerations and respectively small dislocations of the movable element 103, only a small change in impedance Z may be measured. This may make it easy to detect high accelerations while small movements are suppressed. I.e. this may be a good sensing method when higher accelerations are desired to measure, such as in crash sensors and fall sensors. For large accelerations and respectively large movements of the movable element 103, a large change in impedance Z may be measured. Thus, an improved measurement for high accelerations may be provided. Signals for small accelerations may be filtered automatically because small accelerations would only lead to small changes in impedance.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

REFERENCE NUMERALS 100 capacitive sensor device
101 first electrode
102 second electrode
103 movable element
104 first capacitor
105 second capacitor
110 main moving direction
201 capacitor of the further electrode
202 further electrode
301 anchor point
302 spring element
303 electrode finger
304 movable finger
305 first partial capacitor
306 second partial capacitor
401 substrate
501 silicon layer
502 buried oxide layer
503 mask

The invention claimed is:

1. A capacitive sensor device, the device comprising:
a silicon-on-insulator (SOI) stack including a substrate having an upper portion arranged for providing support thereon along a plane, an insulator layer on the upper portion, and a silicon layer on the insulator layer and separated from the substrate by the insulator layer;
a first electrode including a first portion of the silicon layer fixedly secured to the substrate via a first portion of the insulator layer;
a second electrode including a second portion of the silicon layer fixedly secured to the substrate via a second portion of the insulator layer; and
a movable element including a third portion of the silicon layer electrically decoupled from the substrate and including a first outer conductive portion and a second outer conductive portion laterally offset, relative to the upper portion of the plane, respectively from the first electrode and the second electrode, wherein a portion of the insulator layer between the movable element and the substrate is removed and the movable element is configured and arranged to
capacitively couple the first outer conductive portion to the first electrode and effect a first capacitance,
capacitively couple the second outer conductive portion to the second electrode to effect a second capacitance, and
move between the first electrode and the second electrode in a moving direction that is parallel to the substrate in response to an acceleration and thereby alter the first capacitance and the second capacitance due to a change of a position of the movable element;
wherein
the movable element is further configured and arranged to move, between the first electrode and the second electrode in the moving direction, in response to a range of accelerations starting at 2 g and extending up to 10 g,
movement of the movable element being unresponsive to accelerations outside of the range of accelerations, and a first distance between the first electrode and the movable element corresponds to the position of the movable element.

2. The capacitive sensor device of claim 1, further including first and second spring elements connected to the substrate and configured and arranged to support the movable element and to enable the movable element to move between the first electrode and the second electrode in the moving direction; and wherein
the movable element is galvanically decoupled from the substrate; and
the movable element includes
a single continuous beam having a first end connected to the first spring element and a second end connected to the second spring element,
a first set of fingers extending from the single beam toward the first electrode, and
a second set of fingers extending from the single beam toward the second electrode.

3. The capacitive sensor device of claim 1,
wherein a second distance between the second electrode and the movable element corresponds to the position of the movable element.

4. The capacitive sensor device of claim 1,
wherein the first capacitance and the second capacitance are connected in series.

5. The capacitive sensor device of claim 1,
wherein at least one of the first capacitance and the second capacitance comprises a first partial capacitance and a second partial capacitance; and
wherein the first partial capacitance and the second partial capacitance are connected in parallel.

6. The capacitive sensor device of claim 1,
wherein at least a portion of the movable element and a portion of at least one of the first electrode and the second electrode interdigitate with each other.

7. The capacitive sensor device of claim 6,
wherein at least one of the first electrode and the second electrode comprises at least one electrode finger protruding in the direction to the movable element;
wherein the movable element comprises at least one movable finger protruding in the direction of the first electrode or in the direction of the second electrode;
wherein the at least one electrode finger and the movable finger interdigitate with each other; and
wherein the at least one electrode finger and the movable finger are capacitively coupled with each other.

8. The capacitive sensor device of claim 1, wherein the movable element is further configured and arranged to conduct a current from the first electrode to the second electrode.

9. The capacitive sensor device of claim 1, wherein the movable element is located in the same plane as the first electrode and the second electrode.

10. The capacitive sensor device of claim 1, further including anchor points mounted to the substrate and spring elements connecting the movable element to the anchor points, the anchor points being configured and arranged for flexibly fixing the movable element.

11. The capacitive sensor device of claim 1, wherein the first electrode includes a first set of electrode fingers, the second electrode includes a second set of electrode fingers, the first outer conductive portion includes a first set of conductive fingers, and the second outer conductive portion includes a second set of conductive fingers, wherein the movable element is configured and arranged to capacitively couple to the first set of electrode fingers via the first set of conductive fingers and capacitively couple to the second set of electrode fingers via the second set of conductive fingers.

12. The capacitive sensor device of claim 1, wherein the movable element is further configured and arranged to provide a measurement of a reciprocal sum of the first capacitance and the second capacitance.

13. A capacitive sensor device for sensing accelerations, comprising:
means for capacitively coupling a first outer conductive portion of a movable element to a first electrode fixedly secured and electronically coupled a substrate of the sensor device having an upper portion arranged for providing support thereon along a plane, the movable element and the first electrode effecting a first capacitance;
means for capacitively coupling a second outer conductive portion of the movable element to a second electrode fixedly secured and electronically coupled to the substrate of the sensor device, the movable element and the second electrode effecting a second capacitance;
means for laterally moving the movable element, relative to the upper portion of the plane, between the first electrode and the second electrode in response to a range of accelerations starting at 2 g and extending up to 10 g, and in such a manner that the first capacitance and the second capacitance are altered due to a change of a position of the movable element; and
electrically decoupling the movable element from the substrate of the sensor device.

14. The capacitive sensor device of claim 13, wherein the movable element is located in the same plane as the first electrode and the second electrode.

15. The capacitive sensor device of claim 13, wherein the movable element is further configured and arranged to provide a measurement of a reciprocal sum of the first capacitance and the second capacitance.

* * * * *